United States Patent
DiVerdi et al.

(10) Patent No.: US 8,760,438 B2
(45) Date of Patent: Jun. 24, 2014

(54) SYSTEM AND METHOD FOR SIMULATING STIFF BRISTLE BRUSHES USING STIFFNESS-HEIGHT PARAMETERIZATION

(75) Inventors: Stephen J. DiVerdi, San Francisco, CA (US); Sunil Hadap, San Jose, CA (US); Aravind Krishnaswamy, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1062 days.

(21) Appl. No.: 12/790,599

(22) Filed: May 28, 2010

(65) Prior Publication Data

US 2013/0120324 A1    May 16, 2013

(51) Int. Cl.
*G06F 3/033* (2013.01)
*G06F 3/048* (2013.01)

(52) U.S. Cl.
USPC .......................................... 345/179; 715/764

(58) Field of Classification Search
CPC ..... G06T 11/001; G06T 11/20; G06T 11/203; G06T 11/00; G06T 11/60; G06F 3/033; G06F 3/0414; G06F 3/04845; G06F 3/048; G06F 3/04883; G06F 3/0481; G06F 3/0354–3/03545
USPC ................ 345/179–185, 441–443; 178/19.01–19.07; 382/119–123; 715/764
See application file for complete search history.

(56) References Cited

U.S. PATENT DOCUMENTS

| | | | | |
|---|---|---|---|---|
| 5,239,292 A * | 8/1993 | Willan | ........................... | 345/441 |
| 5,343,220 A * | 8/1994 | Veasy et al. | ................... | 715/702 |
| 5,347,620 A * | 9/1994 | Zimmer | ........................ | 345/592 |
| 5,357,265 A * | 10/1994 | Searby et al. | ................. | 345/179 |
| 5,434,959 A * | 7/1995 | Von Ehr et al. | ............... | 345/441 |
| 5,861,878 A * | 1/1999 | Lee | ............................... | 345/179 |
| 6,067,073 A * | 5/2000 | Rae-Smith et al. | .......... | 345/589 |
| 6,373,490 B1 * | 4/2002 | Bendiksen et al. | .......... | 345/441 |
| 6,603,463 B1 * | 8/2003 | Rising, III | ..................... | 345/179 |
| 6,801,211 B2 * | 10/2004 | Forsline et al. | ............... | 345/581 |
| 7,158,138 B1 * | 1/2007 | Bronskill et al. | ............. | 345/441 |
| 7,656,406 B1 * | 2/2010 | Bartell et al. | ................. | 345/441 |
| 8,379,047 B1 * | 2/2013 | DiVerdi | ........................ | 345/592 |
| 8,605,095 B2 * | 12/2013 | DiVerdi et al. | ................ | 345/441 |
| 2002/0085003 A1 * | 7/2002 | Nagashima | ................... | 345/441 |
| 2003/0117408 A1 | 6/2003 | Forsline | | |
| 2006/0084039 A1 * | 4/2006 | Ryokai et al. | ................ | 434/155 |
| 2008/0046226 A1 | 2/2008 | Massie et al. | | |
| 2011/0181618 A1 * | 7/2011 | DiVerdi et al. | ............... | 345/620 |
| 2013/0120433 A1 * | 5/2013 | DiVerdi et al. | ............... | 345/593 |

OTHER PUBLICATIONS

William Valentine Baxter III. Physically-based Modeling Techniques for Interactive Digital Painting. PhD thesis, University of North Carolina, 2004.

* cited by examiner

*Primary Examiner* — Chanh Nguyen
*Assistant Examiner* — Navin Lingaraju
(74) *Attorney, Agent, or Firm* — Wolfe-SBMC

(57) ABSTRACT

A method, system, and computer-readable storage medium for simulating bristle brush behavior in an image editing application may use stiffness-height parameterization to determine the height of a brush tool above a canvas during a brush stroke. The determination may be dependent on the pressure applied during the stroke (e.g., using a stylus on a pressure-sensitive tablet), and on the stiffness of the brush bristles. The system may select a standard-stiffness or high-stiffness mapping between stylus pressure values and brush height values dependent whether the bristle stiffness value is above or below a pre-determined threshold. The standard-stiffness mapping may apply a linear function to pressure values to determine height values. Using the high-stiffness mapping, the effect of increased pressure on corresponding brush height values may be reduced as bristle stiffness is increased. Adjusting pressure-to-height mapping based on stiffness may allow the system to realistically mimic the behavior of stiff bristle brushes.

20 Claims, 11 Drawing Sheets

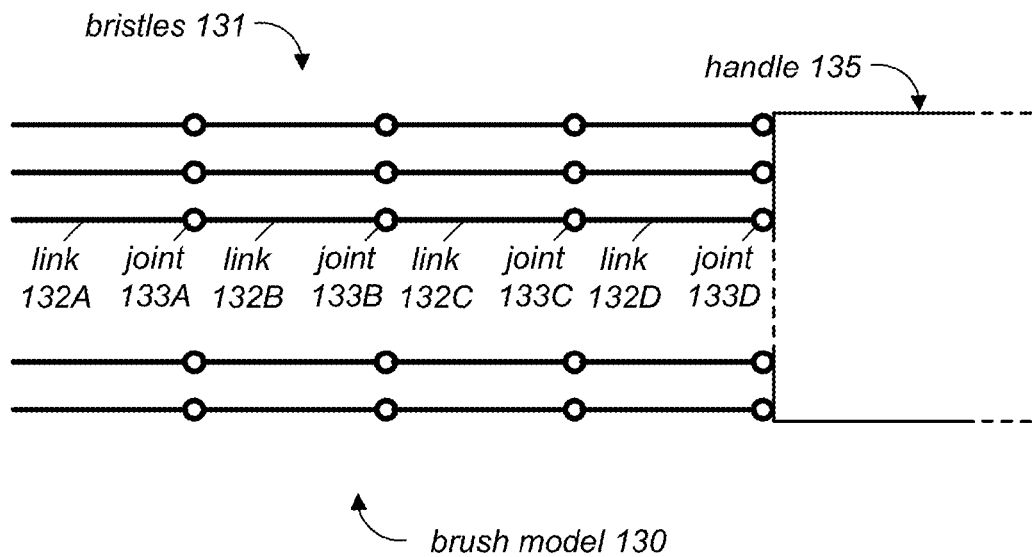
FIG. 3
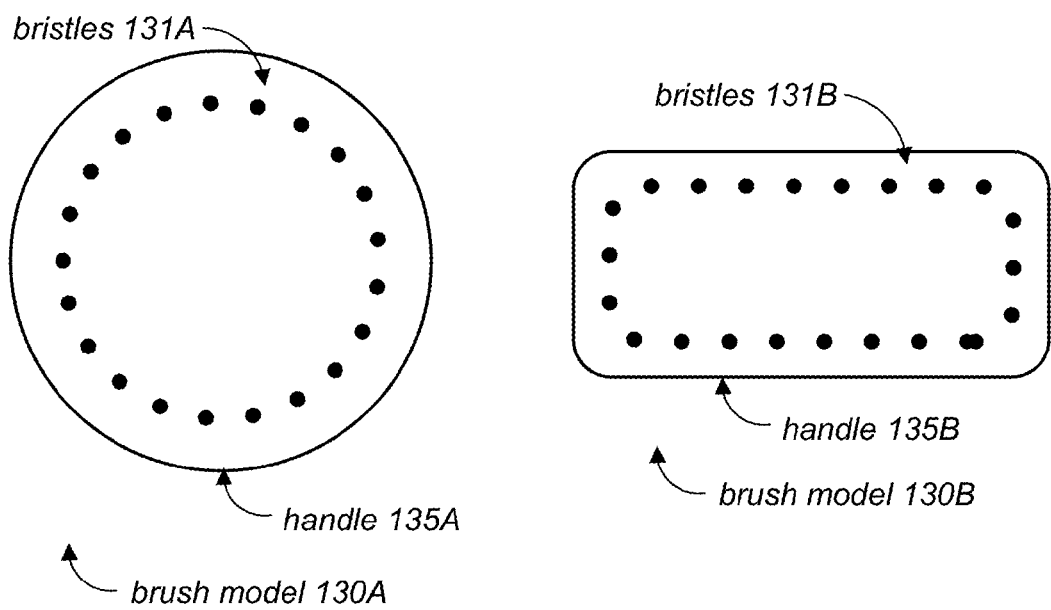
FIG. 4A
FIG. 4B

SYSTEM AND METHOD FOR SIMULATING STIFF BRISTLE BRUSHES USING STIFFNESS-HEIGHT PARAMETERIZATION

BACKGROUND

1. Field of the Disclosure

This disclosure relates generally to computer systems; and more particularly, it is directed to the simulation of bristle brush behavior in an image editing application using stiffness-height parameterization.

2. Description of the Related Art

Digital image editing is the process of creating and/or modifying digital images using a computer system. Using specialized software programs, users may manipulate and transform images in a variety of ways. These digital image editors may include programs of differing complexity, such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. Another commonly used representation is a CMYK color space. In these and other color space representations, an alpha channel may be used to store additional data such as per-pixel transparency values (or the inverse-opacity values). For example, per-pixel data representing paint on a brush tool or on a canvas may include a set of color values (e.g., one per channel) and an opacity value for the paint.

An operation often provided by a digital image editor is the use of a virtual "paintbrush" (also referred to herein as a "brush" or a "brush tool") to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image. In some systems, a brush tip is represented as a single triangle mesh.

Typical brush simulations use a static mapping of stylus pressure to brush height that does not vary with bristle stiffness. As such, they are not able to reproduce the behavior of a variety of different bristle stiffness values. Some existing brush simulations use a haptic feedback device as input, but such devices are not in widespread commercial use. In addition, these simulations typically focus on the forces of the fluid simulation and not on bristle stiffness. Other existing brush simulations use physical brushes as input to painting simulations, requiring an elaborate hardware setup not available to end users.

SUMMARY

The method, system, and computer-readable storage medium described herein for simulating bristle brush behavior in an image editing application may use stiffness-height parameterization to determine the height of a brush tool above a canvas during a brush stroke. In some embodiments, the image editing application may determine a height value representing the height of the brush tool above the canvas during the brush stroke using a mapping between pressure values and height values that is dependent on a stiffness value associated with the brush tool and/or its bristles. The image editing application may then determine an effect of the brush stroke on the canvas dependent on the determined height value, and may store data representing an image on the canvas that was modified by the brush stroke.

In some embodiments, the image editing application may receive user input representing a stroke made by a paintbrush comprising multiple bristles sweeping across a canvas. For example, the image editing application may receive user input representing a brush stroke sweeping across a canvas through a brush tool of a graphical user interface (GUI) of the image editing application. In some embodiments, the input representing the brush stroke may be received from a pressure-sensitive tablet to which the user applies a stylus.

As noted above, in some embodiments, the determination of the brush height above the canvas may be dependent on both the pressure applied during the stroke (e.g., using a stylus on a pressure-sensitive tablet), and on the stiffness of the brush bristles. Input specifying the stiffness value may be received directly from the user through the GUI of the image editing application, in some embodiments. In other embodiments, the image editing application may receive input specifying that the brush tool is of a particular brush tool type, and may access data comprising one or more parameter values associated with the particular brush tool type, including a stiffness value for the brush tool type. In some embodiments, the image editing application may receive input specifying the pressure value for the brush stroke directly from a user through the GUI of the image editing application, and the pressure value may be a static pressure value to be applied throughout the entire brush stroke. In other embodiments, the image editing application may receive continuous input representing changing pressure values, each of which is applied during a portion of the brush stroke. For example, such continuous input may be received from a user using a stylus on a pressure-sensitive tablet to define the brush stroke. In such embodiments, the user may apply varying amounts of pressure at different points in the stroke, and corresponding pressure values may be input to the image editing application to determine the height of the brush tool above the canvas as the pressure changes.

In some embodiments, the image editing application may select one of a plurality of mappings between pressure values and height values dependent the bristle stiffness value. For example, the image editing application may determine whether the stiffness value is less than a given stiffness threshold value, and may select and apply a standard-stiffness or high-stiffness mapping to the pressure value to determine the height value depending on whether the stiffness value is less than or not less than the stiffness threshold value. In some embodiments, a standard-stiffness mapping may apply a linear function to pressure values to determine height values for brushes having low to mid-range stiffness values. A standard-stiffness mapping may map a maximum pressure value to a height value indicating that the brush tool is deformed by a maximum amount (e.g., that the brush tool is pressed far into the canvas). In some embodiments, a high-stiffness mapping may reduce the effect of increased pressure on corresponding brush height values as bristle stiffness is increased. In some embodiments, a high-stiffness mapping between pressure values and height values may map a maximum pressure value to a height value indicating that the brush tool is deformed by less than an amount by which the brush tool would be deformed if a standard-stiffness mapping were applied to the pressure value.

Adjusting pressure-to-height mapping based on bristle stiffness may allow the system to realistically mimic the behavior of a variety of brushes having different bristle stiffness values, including very stiff bristle brushes, without requiring special hardware.

BRIEF DESCRIPTION OF THE DRAWINGS

FIG. 3 is a block diagram further illustrating a brush model, according to one embodiment.

FIGS. 4A and 4B are block diagrams illustrating examples of brush models, according to various embodiments.

Figure 1:
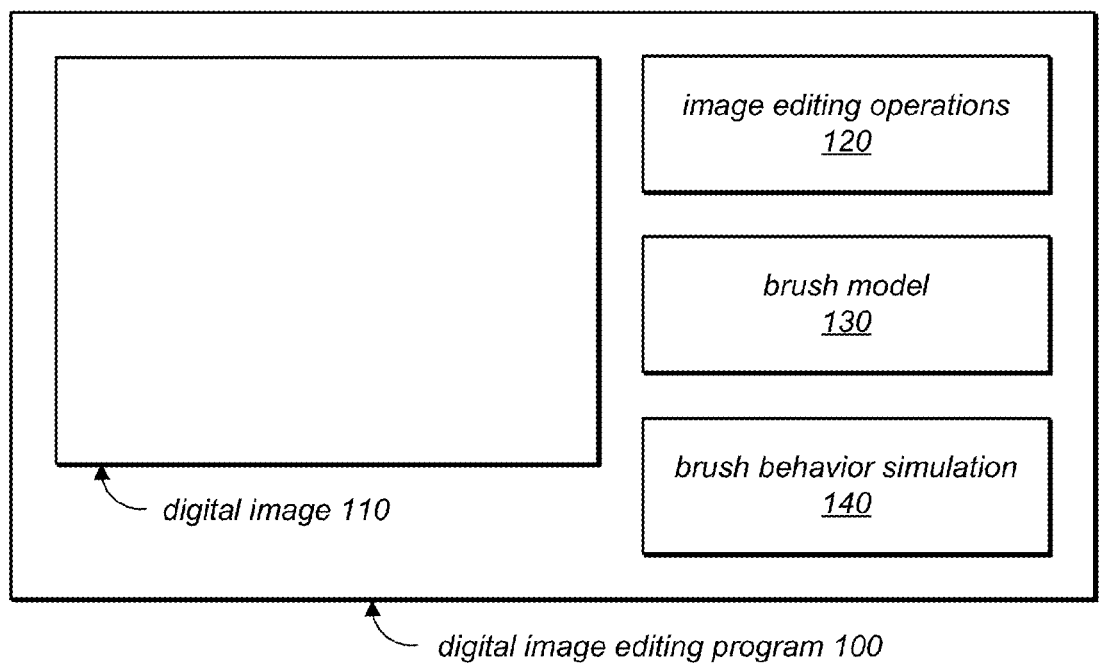
FIG. 1 is a block diagram illustrating one embodiment of a digital image editing program configured for the simulation of brushes.

The specific embodiments described herein and shown by way of example in the drawings are susceptible to various modifications and alternative forms. It should be understood, therefore, that drawings and detailed description thereto are not intended to be limited to the particular form disclosed, but on the contrary, the disclosure is to cover all modifications, equivalents and alternatives falling within the spirit and scope as defined by the appended claims.

DETAILED DESCRIPTION OF EMBODIMENTS

To create a realistic simulation of the physics of the bristle tip of a paintbrush, in some embodiments, an image editing application may provide a way to control a stiffness parameter for the brush and/or its individual bristles. In some embodiments, the image editing application may support brush models having a range of values corresponding to a physical stiffness parameter. Such a stiffness parameter may in some embodiments be used to represent bristles ranging from limp strings to stiff wires, and everything in between. A significant component of the perception of stiffness may be the amount of force feedback experienced when creating a mark with a brush stroke. Therefore, in some embodiments, the system described herein may provide a way to adjust the input mapping for a bristle brush to better recreate the effect of painting with brushes whose bristles have varying stiffness values, including those having extremely stiff bristles.

In some embodiments, stroke generation for a bristle brush may be modeled in an image editing application as if each bristle creates a polygon representing the swept area covered by the bristle over some unit time. The realistic simulation of the bristle brush may be performed by reproducing the springy physics of each individual bristle. In some embodiments, this may be accomplished by modeling each bristle as a set of rigid links connected by angular springs. In such embodiments, the stiffness of the bristle may be adjustable by setting the stiffness of each of those springs. This may create a reasonable approximation of the bending forces involved in the changing shape of a bristle as it is dragged across a canvas.

In some embodiments, user input for a brush stroke, including pressure, may be gathered from a tablet device. In such embodiments, pressure applied to the tablet by a stylus may be mapped to the height of the brush above the canvas and/or may be normalized, as described herein. For example, a pressure value of 0 may indicate that the tip of the bristles are just above the canvas, and a pressure value of 1 may indicate that the brush is pressed into the canvas as far as it can go, e.g., so that the ferrule is almost touching the canvas. Note that although one difference in usage between a medium stiffness brush (e.g., a standard paint brush) and a high stiffness brush (e.g., a wire brush) is that the force necessary to press the brush down into the canvas may be much greater for the high stiffness brush than for the medium stiffness brush, the input device may not reflect this difference in force. In other words, it may be just as easy for the user to press the stylus into the tablet regardless of the type of brush being simulated, because there may be no force feedback from a typical tablet input device. This limitation may create the effect that simulations of brushes with medium to high stiffness bristles all exhibit the same behavior, because larger forces may be applied invisibly to the user (i.e. internally by the image editing application) to achieve the same brush position, regardless of bristle stiffness.

In some embodiments, the system described herein may provide a method for adjusting the mapping between stylus pressure and brush height for the simulation of bristle brushes having different stiffness values in order to better recreate the effects of painting with different brushes, including brushes with extremely stiff bristles. In other words, the system and methods described herein may provide a way to simulate bristle brushes using stiffness-height parameterization. In such embodiments, the system may not require special hardware for end users to realistically simulate the effects of painting with brushes that have a variety of bristle stiffness values.

The description that follows includes a discussion of a brush stroke model representing a bristle brush, and physical simulations of bristle brushes, as well as descriptions of various embodiments of systems and methods for mapping stylus pressure to brush height dependent the stiffness value of the brush model and/or its constituent bristles.

Using embodiments of the systems and methods described herein, realistic brush behavior may be simulated in a painting application. In one embodiment, the brush behavior may be simulated substantially in real-time to deposit ink or paint onto a virtual canvas. A brush model may include a large set of discrete bristles. The bristles may comprise "virtual" bristles and may also be referred to herein as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. By computing the effect of each bristle independently of other bristles, a faithful reproduction of how a real brush deposits paint or ink and changes shape during a stroke may be achieved.

FIG. 1 is a block diagram illustrating an embodiment of a digital image editing program 100 configured for use with the brush simulation techniques described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

Using the image editor 100, a user may seek to apply pixel values (also referred to herein as "paint" or "ink") such as pixel colors and alpha (e.g., transparency) values to the digital image 110. For example, the user may desire to paint portions of the image 110 using a paintbrush provided by the editing operations 120 of the image editor 100. The digital image editing program 100 may comprise a brush model 130 that is used to model such a paintbrush. The digital image editing program 100 may also comprise instructions to implement brush behavior simulation functionality 140. As will be described in greater detail below, the brush behavior simulation functionality 140 may comprise one or more operations to simulate behavior of a paintbrush. The brush behavior simulation functionality 140 may use the brush model 130.

Figure 2:
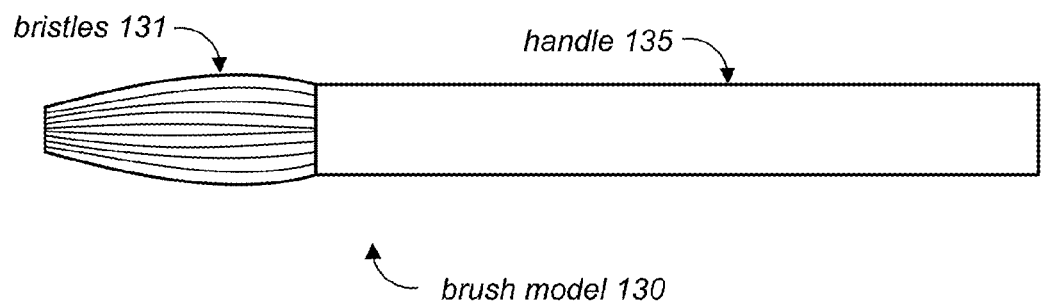
FIG. 2 is a block diagram illustrating a brush model, according to one embodiment.

FIG. 2 is a block diagram illustrating a simplified brush model according to one embodiment. In one embodiment, a brush may be simulated as a set of discrete "virtual" bristles. As shown in FIG. 2, the brush model 130 may comprise a plurality of bristles 131. The plurality of bristles 131 may also be referred to herein as bristle representations 131. In one embodiment, the brush model may also comprise a brush handle 135. The brush handle 135 may also be referred to herein as a brush handle representation 135. The plurality of bristles 131 may be attached to the end of the handle 135. In one embodiment, the bristles 131 may include a sufficient number of individual bristles (e.g., 50 to 100) for accurate simulation of the behavior of a real brush.

FIG. 3 is a block diagram further illustrating a brush model according to one embodiment. Each bristle may comprise a series of links. Each link may comprise a thin cylinder such as a cylinder having a minimal (e.g., nearly zero) radius. The links in a bristle may be connected end-to-end. The connections between links may comprise ball-and-socket joints. The connections between the handle 135 and the first link in each bristle may also comprise ball-and-socket joints. The ball-and-socket joints may permit arbitrary rotational movement with three degrees of freedom (3DOF). As shown in the example of FIG. 3, one bristle may comprise a set of links 132A, 132B, 132C, 132D. The links 132A, 132B, 132C, 132D may be connected to each other by ball-and-socket joints 133A, 133B, 133C. The bristle may be connected to the brush handle 135 by an additional ball-and-socket joint 133D. In one embodiment, the number of links in a bristle may control the size of curves that the bristle can form, where the size is proportional to the length of the bristle. Tighter curves may be possible with more links, and smoother shapes may be typical with fewer links. Because "real world" brush bristles generally do not form tight curves or small loops, few links may be used for each bristle in one embodiment.

In one embodiment, motion of the brush model 130 may be determined using standard articulated rigid body dynamics with hard constraints. Thus, for each object being simulated (e.g., each link or handle), the motion may be computed as a six-degrees-of-freedom (6DOF) rigid body that is subject to the constraints imposed by the joints between objects. A real brush bristle tends to resist deformation by exerting force to restore its shape at rest (i.e., a rest shape). To simulate the stiffness of a brush bristle, each joint in the brush model 130 may exert some force. The rest shape of the bristle may be defined in terms of the rest angles of each joint. For a straight bristle, for example, each angle may be set to zero. Joint limits may be used to restrict the valid angles of each joint to zero, and a stiff constraint force may be used to restore the joint limits. Because brush bristles are a classic stiff dynamic system comprising large forces that change quickly, an implicit solver may be used to ensure stability in one embodiment.

Different types of brushes may be simulated by varying the parameters of the brush model 130. The parameters of the brush model 130 may be altered to generate different bristle materials, different configurations (e.g., arrangements) of bristles, and different types of brush deformation behavior (e.g., bristle splitting, bristle bending, etc.). FIGS. 4A and 4B are block diagrams illustrating examples of different brush types according to one embodiment. For example, a standard round brush may have bristles distributed within a circle on the handle, with the bristles in the same direction and with a tapered end. The brush model 130A shown in FIG. 4A may simulate this circular arrangement of bristles 131A attached to a handle 135A. A flat brush may have a rectangular cross section with bristles of the same length. The brush model 130B shown in FIG. 4B may simulate this arrangement of bristles 131B attached to a rectangular handle 135B. A fan brush may distribute its bristles across an arc with radial direction and uniform length. Additionally, different bristle materials (e.g., camel hair, badger, red sable, nylon, etc.) may be simulated by changing the stiffness of each joint along the bristle. For example, some fiber types may be more stiff overall, and others may be stiff at the base but become less stiff towards the tip.

In one embodiment, the brush model 130 may be used in the simulation of brush behavior (using the brush behavior simulation functionality 140). The shape formed by the bristles in contact with the canvas may be referred to as a brush contact shape. In general, the simulation of brush behavior may include sweeping the two-dimensional (2D) image of the brush contact shape along a 2D curve defined by the motion of the brush between simulation steps. Using prior approaches to create the swept area, the 2D image was stamped at substeps along the curve to approximate the solution for a number of substeps determined by a sampling rate. Use of the brush behavior simulation functionality 140 may substantially avoid the sampling artifacts found in some prior approaches that apply a stamp along a path.

In one embodiment, continuous brush strokes may be created between discrete simulation steps using the brush model 130 discussed above. Because each bristle is simulated as a series of links, the swept volume of a bristle (i.e., the volume swept by a bristle during a stroke) may be computed as the sum of the swept volumes of each link. Each link may comprise a thin cylinder that can be approximated by a line. The swept volume of the thin cylinder may be orthographically projected into 2D to determine the final canvas mark. Therefore, instead of sweeping a cylinder to generate a volume, the final mark may be approximated by sweeping a line for each cylinder to generate a quadrilateral (also referred to herein as a quad).

To sweep a line into a quad, the quad may be constructed by connecting the end points of the beginning line segments and the end points of the ending line segments. Each quad may then be orthographically projected to the canvas plane to create the final mark. To simulate the portion of each bristle that is in contact with the canvas, a height threshold may be used to clip the portion of each bristle that is not in "contact" with the canvas (i.e., above the height threshold). Using this clipping technique, the behavior of pushing the brush harder into the canvas to create a larger mark may be simulated.

Figure 5A:
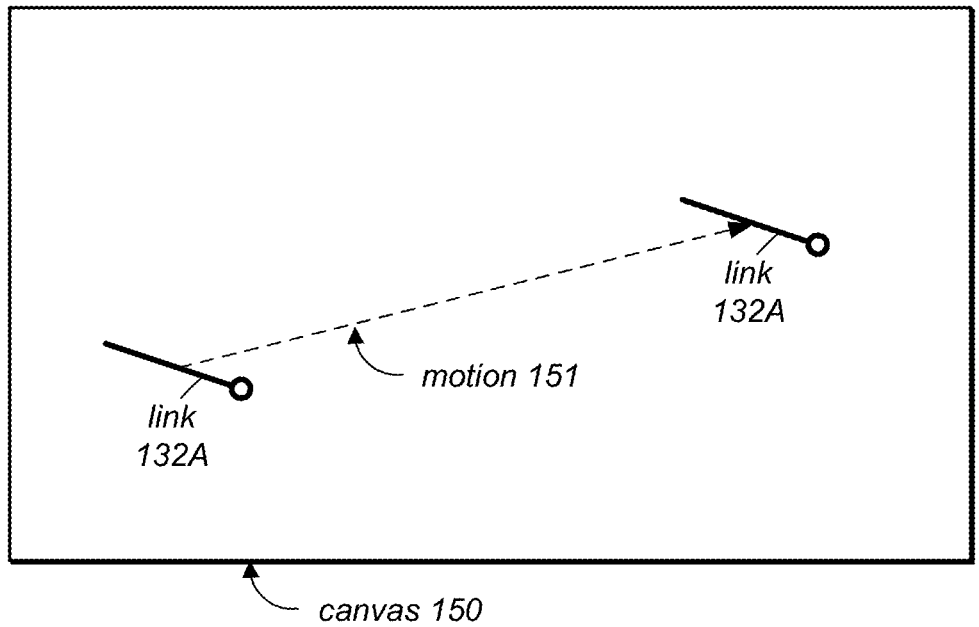
FIGS. 5A and 5B are block diagrams illustrating examples of a brush behavior simulation, according to one embodiment.
Figure 5B:
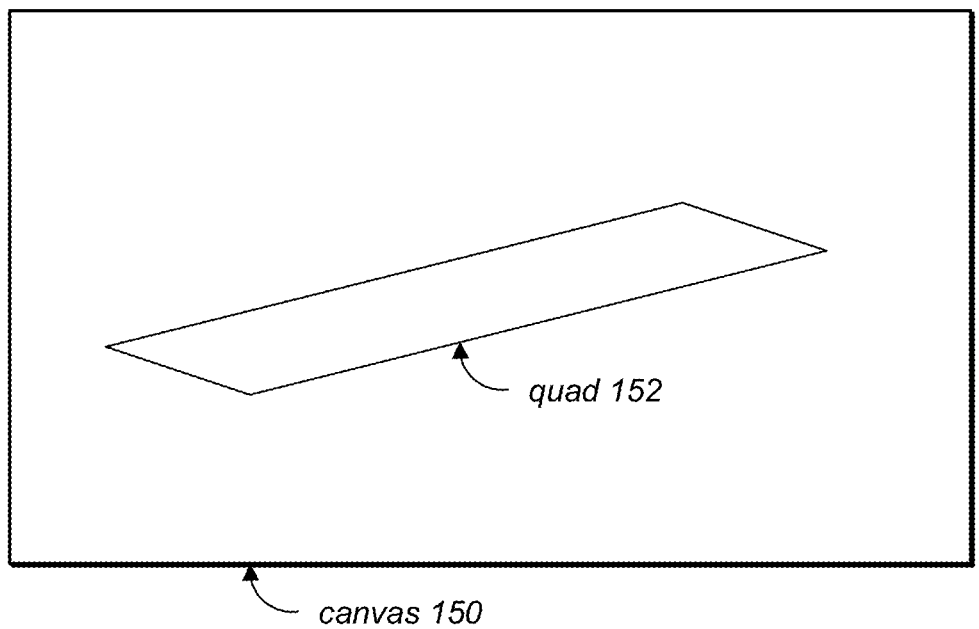

FIGS. 5A and 5B are block diagrams illustrating an example of the brush simulation according to one embodiment. FIG. 5A shows a link 132A of a bristle in "contact" with a canvas 150. The canvas 150 may represent a portion of a larger canvas. The canvas 150 is "painted" by moving the link 132A according to a particular motion 151. The two instances of the link 132A may correspond to two steps in a brush simulation. In the example shown in FIG. 5A, the entire link 132A is in contact with the canvas at both the beginning and end positions. FIG. 5B illustrates the quad 152 that is generated by the motion of the link 132A in contact with the canvas. The quad 152 may be generated by connecting the endpoints of the line segment corresponding to the link as it contacts the canvas at the two positions. A mark (also referred to as "paint" or "ink") corresponding to the quad 152, including one or more pixels with appropriate color and transparency values, may be generated in a corresponding location in the digital image 110. By generating a quad and a corresponding mark in this manner for every link in every bristle that contacts the canvas, continuous brush strokes may be created between discrete simulation steps using the brush model 130. In one embodiment, the same region of the canvas may be stroked more than once to simulate a buildup of paint or ink that results in a darker color than a single stroke.

In one embodiment, the approximation of a bristle's swept area may be inaccurate if a quadrilateral corresponding to a nearly vertical bristle is too thin to leave a mark because no pixels are hit by the projection onto the canvas. To account for this potential inaccuracy, a line segment having a width of one may be rasterized for each bristle between the end points of the bristle's last link. In this manner, each bristle in contact with the canvas may be guaranteed to make a minimum thickness mark (e.g., a mark of at least one pixel) under any deformation. Although the resulting additional pixel along the edge of the brush's mark may be incorrect when the bristle is not vertical, the error may be too small to affect the final output mark significantly.

Appropriate user input may be captured in connection with the brush behavior simulation functionality 140. For example, the user input may include a selected brush type as well as the position of the brush and the direction of its movement relative to a canvas. The user input may also include a "pressure" value that may be captured with an appropriate input device such as a digitizing tablet and/or stylus. The input pressure may be used to simulate the pressure applied to the brush. Using the brush model 130 and brush behavior simulation 140 discussed above, the input pressure may be used to deform the bristles 131 into a wide range of shapes in contact with the canvas. The shape of the brush tip may change throughout a stroke as the input pressure changes.

Figure 6:
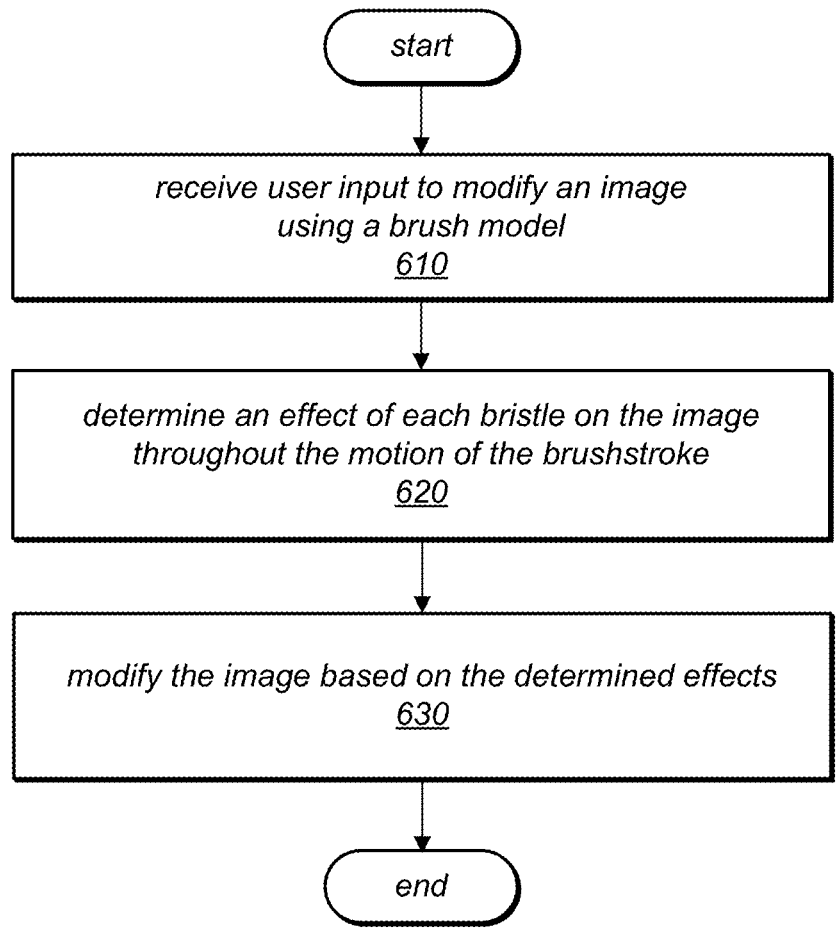
FIG. 6 is a flow diagram illustrating a method for simulating brush behavior, according to one embodiment.

FIG. 6 is a flowchart illustrating a method for simulating brush behavior according to one embodiment. As shown in 610, user input may be received to modify an image using a brush model. As discussed above, the brush model may comprise a plurality of bristle representations, and each bristle representation may comprise a series of one or more links. The user input may comprise a motion of the brush model, such as a motion between a first position (e.g., at a first simulation step) and a second position (e.g., at a second simulation step). The user input may also comprise one or more paint values representing a color of the "paint" or "ink" sought to be applied.

As shown in 620, an effect (if any) of each of the plurality of bristle representations on the image throughout the motion may be determined. In one embodiment, a continuous stroke may be determined in 620 for each of the plurality of bristle representations between the first simulation step and the second simulation step. In one embodiment, an approximation of a volume swept by each bristle representation between the first simulation step and the second simulation step may be determined in 620. In one embodiment, a clipping operation may be used in 620 to determine a portion of the plurality of the bristle representations located between a canvas and a plane above the canvas.

In one embodiment, a set of the links that contact the canvas in the first simulation step and the second simulation step may be determined in 620. A quadrilateral may be determined for each link in this set of links. The quadrilateral may comprise the end points of the portion of the respective link contacting the canvas at the first simulation step and the second simulation step. The effect of the paint in each quadrilateral may then be determined.

As shown in 630, the image may be modified based on the determined effect of each of the plurality of bristle representations on the image throughout the motion. For example, color values of pixels affected by the stroke of the brush may be modified. In one embodiment, each bristle representation in "contact" with the canvas may affect at least one pixel along its path from the first simulation step to the second simulation step.

In one embodiment, a suitable simulation engine such as the Open Dynamics Engine (ODE) may be used to implement the brush model 130 and/or brush behavior simulation 140 discussed above. ODE may comprise a framework for constrained dynamics simulations. Using ODE, each of the bristles 131 may be modeled as a chain of rigid capped cylinders (e.g., capsules) connected end-to-end by rotational joints, with each bristle attached at one end to the brush handle 135. The joints may be modeled as 3DOF ball-and-socket joints. The canvas 150 may be modeled with a single plane. The bristles 131 may collide with the plane of the canvas during a stroke, and the collision may cause the brush tip to deform. The user input may be used to generate the brush position with an explicit restorative force computed at each timestep. Given the target pose (e.g., position and orientation), the force and torque needed to change the brush's current pose and momentum to the target pose may be computed directly. The computer force and torque may be applied as external forces using the simulation engine (e.g., ODE).

Restorative forces may be used in the modeling of bristles that attempt to return to a rest shape. In one embodiment, joint limits may be specified using the simulation engine (e.g., ODE) for the modeling of restorative forces. Start and stop angles may be specified for each joint using the simulation engine (e.g., ODE). By setting all the angles to the same value, the effect of a rest angle may be created. The constraint force mixing (CFM) and error reduction parameter (ERP) for a joint may be set to yield behavior equivalent to a spring-damper system, and a force limit may keep the joint from adding too much energy to the simulation at once. In simulating a spring-damper system, the forces may be integrated implicitly so that stiff bristle behavior may be simulated in real-time.

In one embodiment, explicit angular spring forces may be specified using the simulation engine (e.g., ODE) for the modeling of restorative forces. Start and stop angles may be specified for each joint using the simulation engine (e.g., ODE). By setting all the angles to the same value, the effect of a rest angle may be created. The pose of the links may be used to compute the angular spring torques manually after each simulation step. The angular spring torques may then be applied to the links as external forces.

The simulation engine (e.g., ODE) may be used to implement a constrained dynamics simulation. A constrained dynamics simulation may solve for constraint forces by creating an N·N matrix, where N is the number of degrees of freedom that are constrained. For bodies called islands that do not have constraints between them and do not interact, the matrix may be split into separate matrices for each island. Each matrix may be solved independently for a particular island. Because solving the matrix may be a problem of complexity $O(N^3)$, solving islands separately may typically be faster than solving the same bodies as one interrelated system. Therefore, the simulation of the brush behavior may be more computationally efficient if the brush bristles are separated so they are independent of one another.

As discussed above, each bristle may be connected by a joint to the same brush handle 135. However, because the handle mass may be large in comparison to the bristle mass, the error in brush pose for each frame may be very small. Thus, the brush handle 135 may be modeled as many separate brush handle bodies using the simulation engine (e.g., ODE). Each bristle may be attached to one of the separate brush handle bodies using a ball-and-socket joint. Although the computation of the force and torque necessary to move a brush handle may be performed separately for each brush handle body, such a computation is relatively inexpensive. The separation of the bristles permitted by the use of multiple brush handle bodies may permit each bristle to be solved independently. Therefore, the brush behavior simulation 140 may be both computationally efficient and scalable in a multi-processor or multi-core environment. In one embodiment, for example, 40 bristles may be simulated at 60 Hz on one core; alternatively, 75 bristles may be simulated at 30 Hz on one core.

In one embodiment, inter-bristle forces may be simulated. By including bristle-to-bristle collisions, contact joints between bristles may be created to enforce penetration constraints. By simulating inter-bristle forces, the bristles may spread and appear to maintain the volume of the brush tip more naturally when pressed into the canvas. In one embodiment, an approximation of the inter-bristle forces may be included in the brush behavior simulation 140 to achieve similar effects in a more computationally efficient manner. For example, explicit penalty forces may be added to provide similar bristle-to-bristle collision behavior without the need for additional constraints.

In one embodiment, the simulation engine (e.g., ODE) may provide various mechanisms for enforcing constraints in the simulation. One constraint enforcement mechanism may be referred to as dWorldStep. The dWorldStep functionality may be used to construct and solve the constraint matrix in $O(N^3)$ time. Another constraint enforcement mechanism may be referred to as dWorldQuickStep. The dWorldQuickStep functionality may be used to perform iterative relaxation to approximate the correct constraint forces in $O(M\ N)$ time, where M is the number of iterations (e.g., 20). In one embodiment, the use of dWorldQuickStep in the brush behavior simulation may be faster than the use of dWorldStep. For example, for a 5-link bristle in which each joint is 3DOF, there are 15 constraints. Solving the matrix using dWorldStep may take approximately 3375 (i.e., $15^3$) units of time while solving the approximation using dWorldQuickStep may take approximately 300 (i.e., 15×20) units of time. The relative efficiency of dWorldQuickStep may be even more pronounced when inter-bristle forces are included.

As noted above, the system described herein may provide a method for adjusting the mapping between stylus pressure and brush height for the simulation of bristle brushes having different stiffness values in order to better recreate the effects of painting with different brushes, including brushes with extremely stiff bristles. In some embodiments, user input may be gathered from a six-degree-of-freedom (6DOF) tablet device. For example, the six degrees of freedom may include x and y positions, a pressure, and three orientation angles (yaw, pitch, and roll). In some embodiments, the pressure may be mapped to the height of the brush above the canvas, and this mapping may be normalized such that a pressure of 0 indicates that the tips of the bristles are just above the canvas, and a pressure of 1 indicates that the brush is pressed into the canvas as far as it can go, e.g., so that the ferrule is almost touching the canvas. This is illustrated in FIGS. 7A and 7B, according to one embodiment.

Figure 7A:
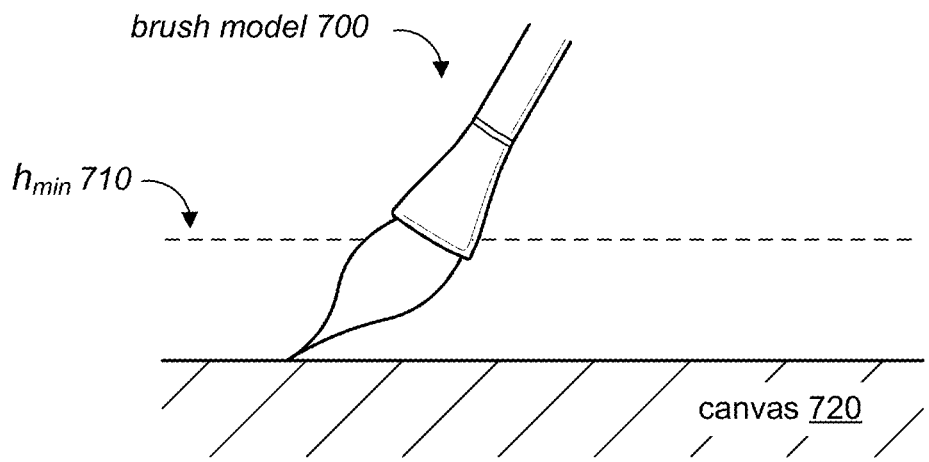
FIGS. 7A and 7B illustrate the effects of different pressures on a brush model, according to one embodiment.
Figure 7B:
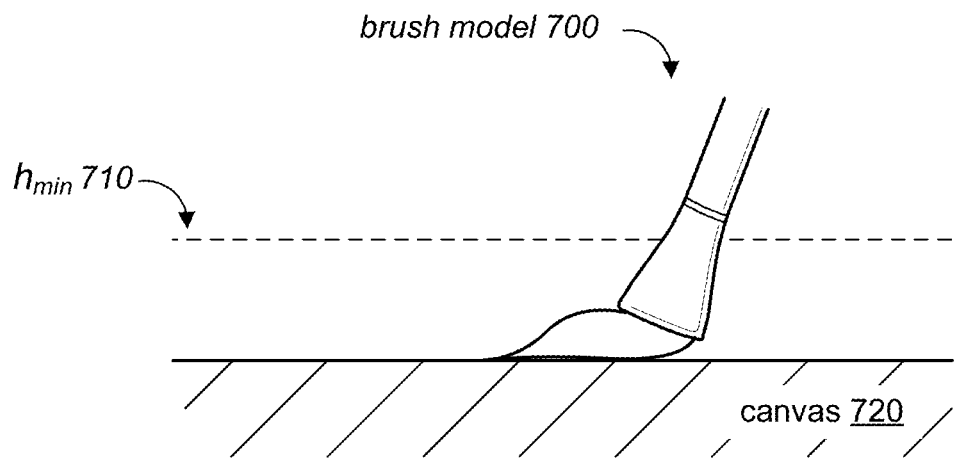
Figure 11:
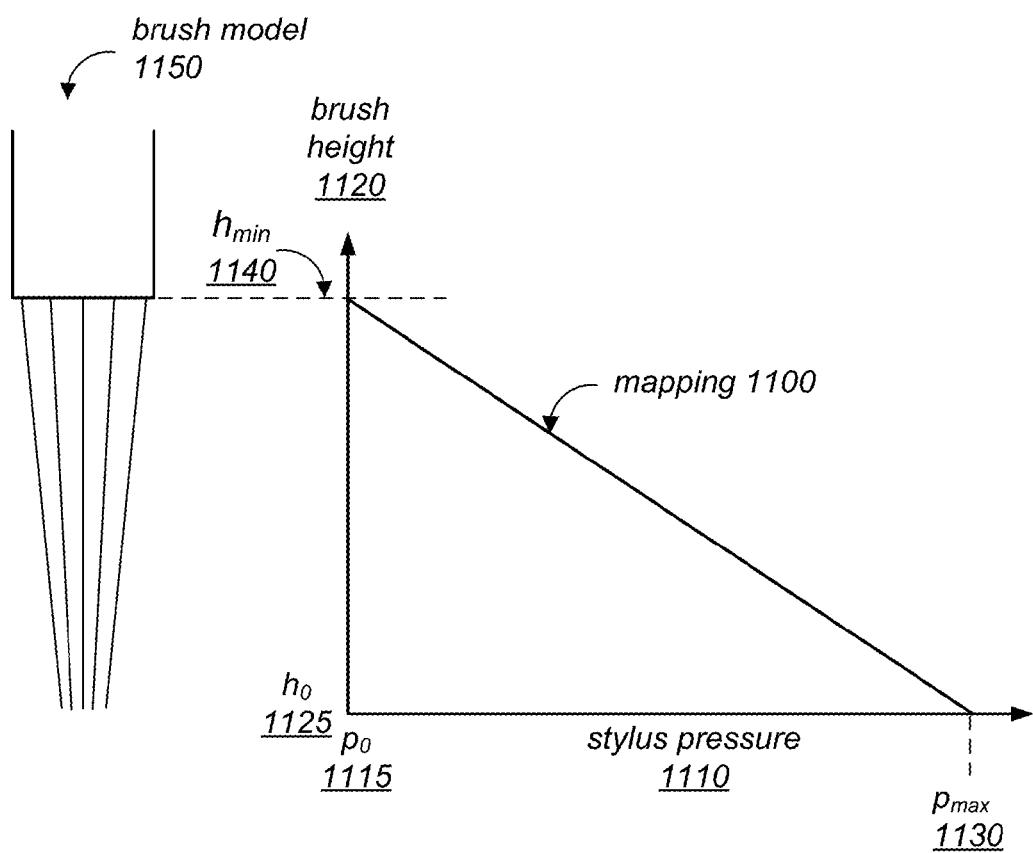
FIG. 11 is a graph illustrating a linear mapping of pressure to height suitable for describing the behavior of paintbrushes with bristles having low to mid-range stiffness values, according to various embodiments.
Figure 12:
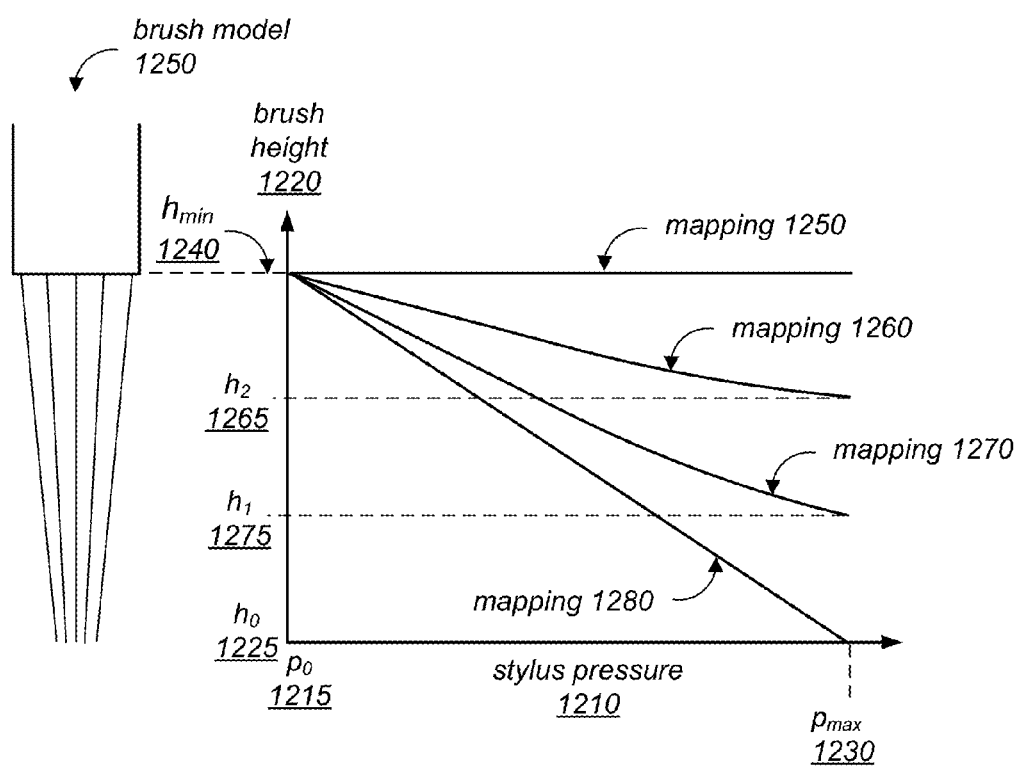
FIG. 12 is a graph illustrating a variety of mappings between pressure and height for use in simulating paintbrushes whose bristles have a variety of stiffness values, according to one embodiment.

In this example, FIG. 7A illustrates a brush model 700 to which a normalized pressure of 0 is applied. As illustrated in FIG. 7A, the tip of the brush model is just touching the surface of canvas 720. In some embodiments, the normalized pressure-to-height mapping means that when the pressure is 0, the height of the brush model above the canvas is defined as the minimum height at which the brush can be positioned before bristles start to bend. This is depicted in FIG. 7A as $h_{min}$ 710. FIG. 7B illustrates the brush model 700 when a maximum normalized pressure (i.e. a pressure of 1) is applied. As illustrated in FIG. 7B, when the maximum pressure is applied, the top of the brush model is far below the point at which brush bristles begin to bend (i.e. below the line labeled as $h_{min}$ 710), and the bristles of the brush model are deformed such that they are lying almost flat on the surface of canvas 720. In some embodiments, the height of the brush model when the brush is in this position may represent the maximum possible change in height for the brush model in the normalized representation. This height is indicated in FIGS. 11 and 12 as $h_0$.

As noted above, the difference between the force needed to deform a medium stiffness brush (e.g. a regular paint brush) and a high stiffness brush (e.g. a wire brush) may not be reflected in image editing applications in which it is just as easy for a user to press the stylus into the tablet regardless of the type of brush being simulated (i.e. using input mechanisms for which there is no force feedback). For example, in some embodiments, a standard pressure-to-height mapping may take the form of a linear function that maps normalized pressure values (e.g., values normalized to a range between 0 and 1) to normalized brush height values (e.g., values normalized to a range between 0 and 1) regardless of the stiffness of the brush being modeled. One such linear mapping function, in which the brush height (with respect to the canvas) may be computed as a function of stylus pressure h(p): [0, 1]→[0, 1] is as follows:

$$h(p)=-p+1 \tag{1}$$

Artists have noted that such a single, linear mapping may render the specification of a bristle stiffness parameter value useless because the mapping does not depend on the bristle stiffness value. In other words, using this equation, a given pressure applied to the stylus will always result in the same deformation of the bristles, even though a physical brush with very stiff bristles would be very difficult to get to deform at all. Therefore, in some embodiments, the system described herein may employ a different pressure-to-height mapping that is dependent on the bristle stiffness value. In such embodiments, when simulating brushes with stiffer bristles, those bristles may be more difficult to deform, i.e. the deformation of these bristles may be less than that of less stiff bristles at the same (e.g., at the maximum) stylus pressure.

In some embodiments, to create a more realistic feeling when simulating the behavior of brushes with high bristle stiffness, rather than directly mapping the stylus pressure to the brush height, the system described herein may implicitly map the stylus pressure to the force pressing the brush down into the canvas. However, it may be difficult to achieve stable, low jitter simulations when directly using stylus pressure to control brush pressure, thus resulting in bouncy brush behavior. In some embodiments (e.g., based on the observation that as a user presses a stylus into a tablet with the same maximum pressure, a stiffer brush should resist that constant pressure by not being pressed as far into the canvas), the system may achieve realistic results by reducing the effect of the pressure-height mapping as stiffness increases.

Figure 8A:
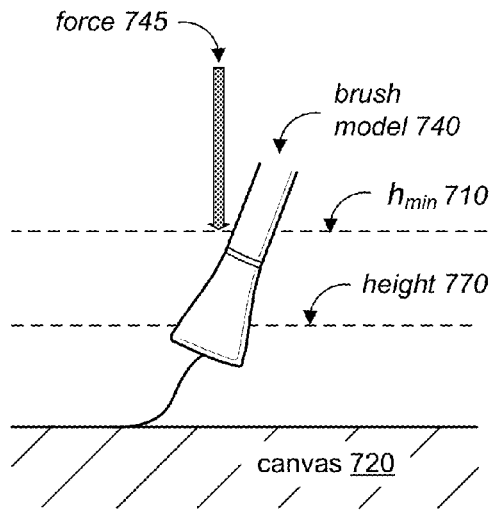
FIGS. 8A-8C illustrate the effects of different amounts of force on brush models whose bristles have different stiffness values, according to one embodiment.
Figure 8B:
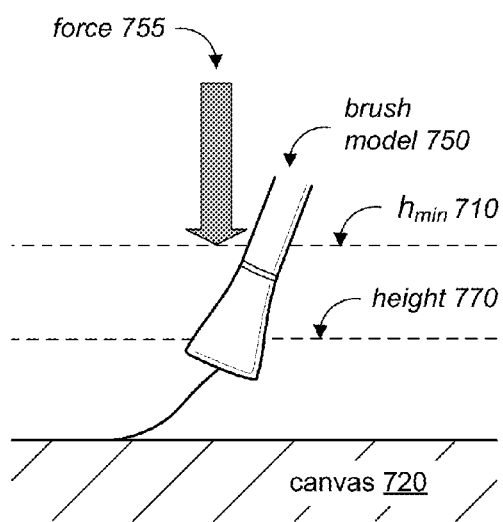
Figure 8C:
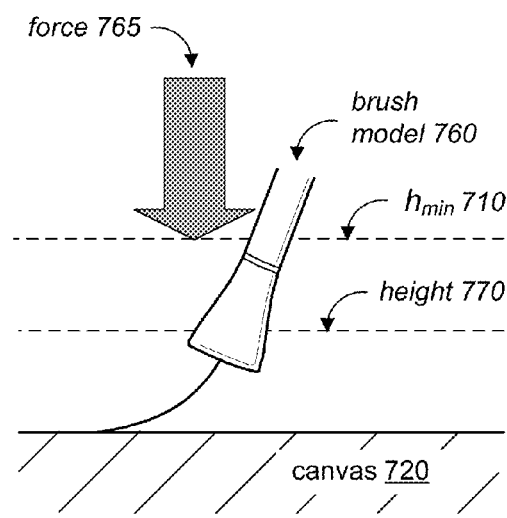

FIGS. 8A-8C illustrate three brush models to which various forces are applied during a brush stroke, according to one embodiment. Each of these three brush models may be similar to brush model 700 illustrated in FIGS. 7A and 7B, except that the bristles have different stiffness values. As illustrated in this example, the force exerted on each of the brush models is different, but the effect on the height of the brush model is the same. For example, brush model 740 in FIG. 8A has bristles with a low stiffness value. Therefore, only a small amount of force (depicted in FIG. 8A as force 745) may be needed to press the brush model down toward canvas 720 from the minimum height position ($h_{min}$ 710, the height at which the bristles begin to deform) to a height above the canvas depicted as height 770. By contrast, brush model 750 in FIG. 8B has bristles with a mid-range stiffness value (e.g., a value between the minimum and maximum stiffness values supported in the system, such as a stiffness value that may be associated with a standard paintbrush). Therefore, a larger amount of force (depicted in FIG. 8B as force 755) may be needed to press the brush model down toward canvas 720 from the minimum height position ($h_{min}$ 710, the height at which the bristles begin to deform) to a height above the canvas depicted as height 770. Finally, brush model 760 in FIG. 8C has bristles with a high stiffness value. Therefore, a large amount of force (depicted in FIG. 8C as force 765) may be needed to press the brush model down toward canvas 720 from the minimum height position ($h_{min}$ 710, the height at which the bristles begin to deform) to a height above the canvas depicted as height 770. In some embodiments, the methods described herein may be used to map stylus pressure applied by a user to the resulting height of the brush model dependent on the stiffness of the brush bristles.

Figure 9:
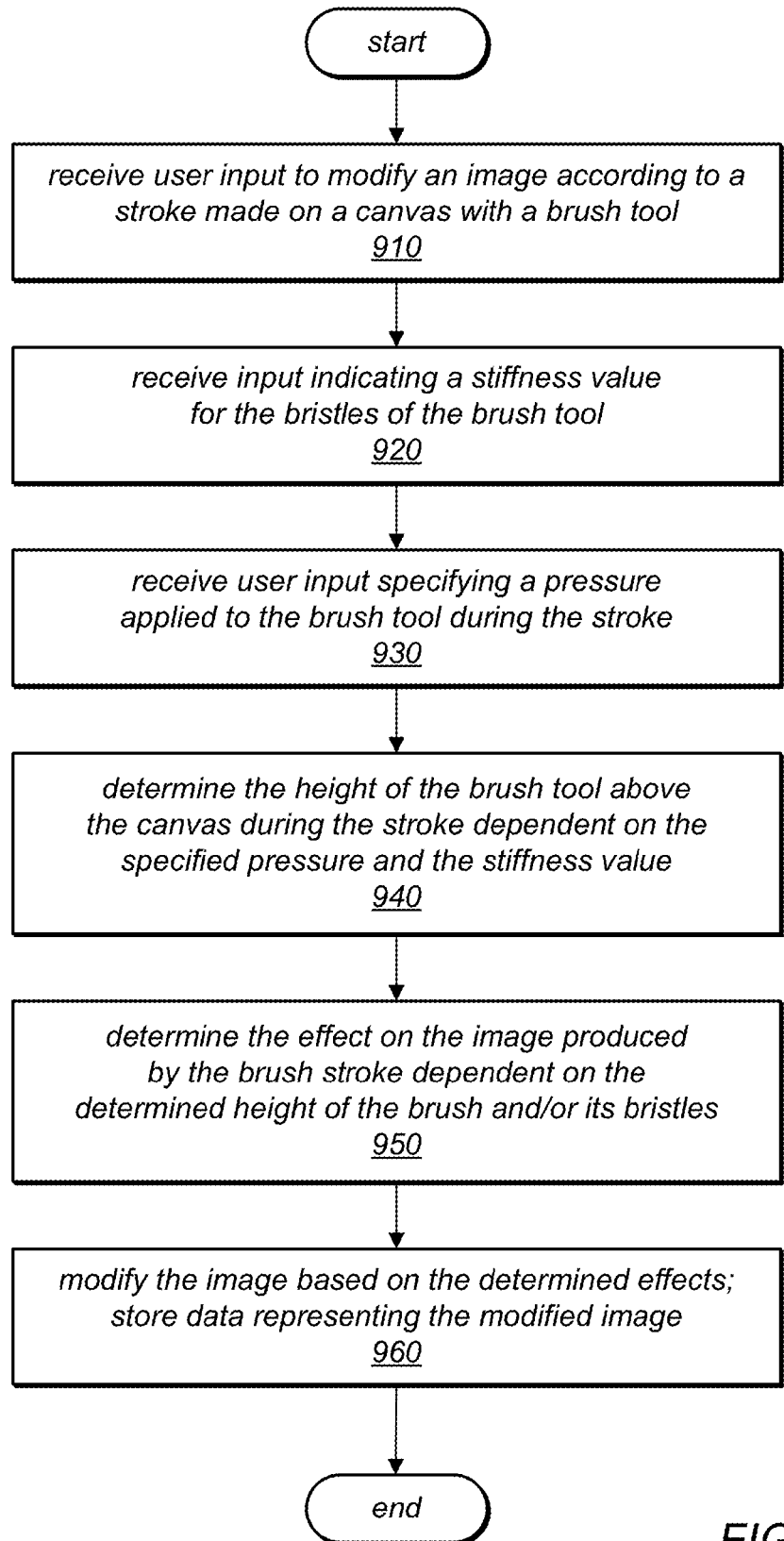
FIG. 9 is a flow diagram illustrating a method for simulating brush behavior using a mapping of stylus pressure to brush height that is dependent on the stiffness of the brush bristles, according to one embodiment.

FIG. 9 illustrates a method for simulating brush behavior using a mapping of stylus pressure to brush height that is dependent on the stiffness of the brush bristles, according to one embodiment. As illustrated at 910 in this example, the method may include an image editing application (e.g., a digital painting application) receiving input to modify an image in a manner defined by a mark made with a bristle brush tool (i.e. a brush stroke). For example, a user may select one of a plurality of available brush tools of a graphical user interface (GUI) of the image editing application, and may use it to "paint" a brush stroke on a blank canvas or on a canvas on which paint has already been deposited. In this example, the method may include the image editing application receiving input indicating a stiffness value for the bristles of the brush tool, as in 920. For example, in some embodiments, the input may specify the type of brush tool to be used to create the mark, and the image editing application may access a data structure that stores parameter information associated with the specified brush tool type data to determine the stiffness value for the bristles of the specified brush tool. In other embodiments, the user may be able to specify a stiffness value for the bristles of the brush tool (e.g., using a slider bar, radio button, or other user input mechanism of the GUI, and the image editing application may receive this information via the GUI. Since the stiffness of brush bristles is a physical characteristic of a paintbrush, the bristle stiffness value specified for a given brush tool and/or a given brush stroke may in some embodiments be considered a static value for the given brush tool, or at least for the duration of the given brush stroke.

As illustrated at 930 in this example, the method may include the image editing application determining receiving user input specifying a pressure to be applied by the brush tool during the stroke. For example, in some embodiments the user may use a slider bar, radio button, or other user input mechanism of the GUI to select a pressure value to be applied during the brush stroke, e.g., to set the value of a configurable pressure parameter for the brush stroke and/or to override a default pressure value in the image editing application. In such embodiments, the specified pressure may be considered a static value to be employed for the duration of the brush stroke. In other embodiments, the user may input continuous pressure information using a pressure-sensitive input mechanism, such as by pressing a stylus to a pressure-sensitive, digitizing tablet. In such embodiments, the user may apply different amounts of pressure at different times or locations during the brush stroke to achieve a desired painting effect.

As illustrated at 940 in FIG. 9, the method may in some embodiments include the image editing application determining the height of the brush tool above the canvas during the stroke, and this determination may be dependent on the specified pressure and the bristle stiffness value. For example, in some embodiments, the height of the brush tool (and/or the bristles there of) may be determined according to a pressure-to-height mapping (e.g., a mapping of stylus pressure to brush height) that varies depending on the bristle stiffness value. As illustrated in this example, the method may include the image editing application determining the effect on the image produced by the brush stroke (e.g., by the deposition of paint or ink on the canvas), and this determination may be dependent on the determined height of the brush bristles. In some embodiments, the height of the brush above the canvas may affect both the number of bristles that are in contact with the canvas and the amount of each bristle that is in contact with the canvas, since the bristles of a brush that is pressed far into the canvas may be deformed such that more of their length is in contact with the surface (e.g., as illustrated in FIG. 7B). Therefore, the height of the brush above the canvas may affect the amount of paint or ink deposited on the canvas by the brush stroke. In some embodiments, the methods described above for modeling bristle brushes and simulating bristle brush behavior may be used to determine the effect on the image caused by the deposition of paint or ink by each of the bristles of the brush tool, and these effects may be composited to determine the cumulative effect of the brush stroke on the image.

As illustrated at 960 in FIG. 9, the method may in some embodiments include the image editing application modifying the image based on the cumulative effect of the brush bristles, and may store data representing the modified image for display and/or subsequent use in the image editing application. For example, in some embodiments, the application may store per-pixel data representing the color and/or opacity values for each pixel of the canvas following the deposition of paint or ink by the brush stroke.

As noted above, in order to create a more realistic experience for a user when applying paint or ink using a variety of brush tools in an image editing application, in some embodiments, the methods described herein may be used to map stylus pressure applied by a user to the resulting height of the brush model dependent on the stiffness of the bristles of the brush tool in use. In such embodiments, a different pressure-to-height mapping may be used with brush models whose bristles have a low to mid-range stiffness value than the pressure-to-height mapping used with high stiffness bristles. In some embodiments, the image editing application may determine which of a plurality of pressure-to-height mappings (or mapping approaches) to apply depending on whether the bristle stiffness value (or a normalized version of the bristle stiffness value) is above or below a pre-determined stiffness threshold. For example, in one embodiment, a single, linear pressure-to-height mapping may be used for brush models with a bristle stiffness value less than or equal to a mid-range stiffness value, while a different mapping (e.g., a different, and possibly non-linear, calculation) may be applied to determine the brush height when the bristle stiffness value is higher than the mid-range stiffness value. In various embodiments, the stiffness threshold used to determine whether a standard or alternate (high-stiffness) mapping should be applied may be a default value of the image editing application, or may be system parameter whose value is configurable (e.g., through the GUI).

In some embodiments, a standard mapping (such as the linear mapping described above and shown in equation (3)) may remain unchanged for brushes with a stiffness value s<0.5, while the mapping may reduce the impact of pressure for brushes with a stiffness value s>0.5, as indicated in the following equations:

$$s'=2s-1 \quad (2)$$

$$h(p,s')=h(p) \, s'<0$$

$$h(p,s')=(1-s')h(p)+s'h_{min} \, s'\geq 0 \quad (3)$$

In these equations, s' may represent a shifted and scaled version of the bristle stiffness value (which may be considered a normalized bristle stiffness value), and $h_{min}$ may represent the minimum height at which the brush tool can be positioned above the canvas such that the bristles are touching the canvas, but the bristles have not started to bend in response to the applied pressure. These functions are discussed in more detail below in reference to FIGS. 11 and 12. In some embodiments, to compute $h_{min}$, the image editing application may take the orientation of the brush taken into account. For example, each bristle's vector in global coordinates may be dotted with the canvas normal (i.e. the dot product, or vector inner product, between these two vectors may be computed), and the maximum length may be equal to $h_{min}$.

Figure 10:
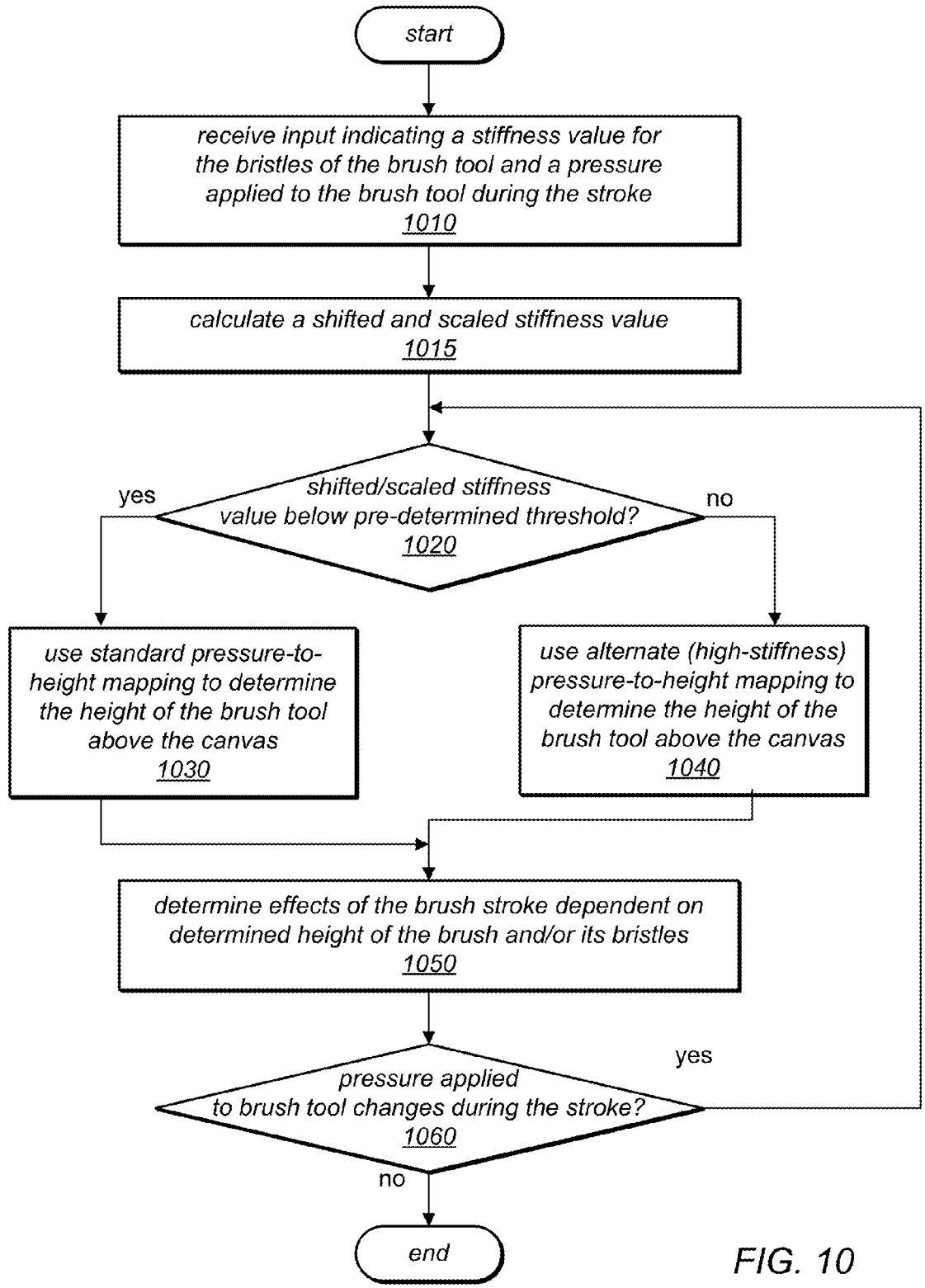
FIG. 10 is a flow diagram illustrating a method for simulating brush behavior using different mappings of stylus pressure to brush height for brush models whose bristle stiffness values are high than for brush models whose bristle stiffness values are low to mid-range values, according to one embodiment.

FIG. 10 illustrates a method for performing a bristle brush simulation that employs a pressure-to-height mapping that is dependent on bristle stiffness, according to one embodiment. As illustrated at 1010 in this example, the method may include an image editing application receiving input indicating a stiffness value for the brush tool and a pressure applied to the brush tool during the stroke. For example, in various embodiments, a user may select one of a plurality of available brush tools for which a bristle stiffness value is defined, or a user may select a bristle stiffness value using a slider bar, radio button, or other input mechanism of a GUI. Similarly, in some embodiments the user may use a slider bar, radio button, or other user input mechanism of the GUI to select a pressure value to be applied during the brush stroke. As described above, in some embodiments, the specified pressure may be considered a static value to be employed for the duration of the brush stroke. In other embodiments, the user may input continuous pressure information using a pressure-sensitive input mechanism, such as by pressing a stylus to a pressure-sensitive, digitizing tablet. In such embodiments, the user may apply different amounts of pressure at different times or locations during the brush stroke to achieve a desired painting effect.

As illustrated at 1015 in this example, the method may include the image editing application calculating a modified version of the specified input value to be used in subsequent calculations in the image editing application. For example, in some embodiments, the image editing application may calculate a shifted and scale stiffness value by applying equation (2) above to generate a normalized stiffness value for the bristles of the brush tool. As illustrated at 1020, the method may include the image editing application determining whether the shifted and scaled stiffness value is below a pre-determined threshold, such as zero. If so, shown as the positive exit from 1020, the method may include the image editing application using a standard pressure-to-height mapping to determine the height of the brush tool above the canvas, as in 1030. In this example, a standard pressure-to-height mapping, such as that illustrated in equation (1) above, may be applied when brush bristles have a low to mid-range stiffness value to reflect the fact that when using brushes that are not very stiff, it does not take much force to change the height of the brush and/or to deform the brush bristles as the brush is pressed to the canvas. In other words, for brushes that are not very stiff, changes in the pressure applied to the brush tool (e.g., increases in the pressure) may translate to corresponding changes in height. Therefore, the linear mapping shown in equation (1), and again in equation (3) for normalized (e.g., scaled and/or shifted) stiffness values less than zero, may provide a realistic simulation of the behavior of a brush stroke made with a brush whose bristles are not very stiff.

In this example, if the image editing application determines that the shifted and scaled stiffness value is at or above the pre-determined threshold (e.g., zero), shown as the negative exit from 1020, the method may include the image editing application using an alternate pressure-to-height mapping (e.g., a high-stiffness mapping) to determine the height of the brush tool above the canvas, as in 1040. In this example, an alternate pressure-to-height mapping, such as that illustrated in equation (3) for normalized (e.g., scaled and/or shifted) stiffness values greater than or equal to zero, may be applied when brush bristles have a high stiffness value to reflect the fact that when using brushes that are very stiff, it takes a lot of force to change the height of the brush and/or to deform the brush bristles as the brush is pressed to the canvas. In other words, for brushes that are very stiff, a change in the pressure applied to the brush tool (e.g., an increase in pressure) may not change the height of the brush very much. In fact, for a brush with bristles having the maximum stiffness supported in the brush simulations of the image editing application, it may not be possible to deform the shape of the bristles or change the height of the brush no matter how much force is applied.

As illustrated at 1050 in this example, once the height of the brush tool has been determined using either a standard or alternate (high-stiffness) pressure-to-height mapping, the method may include the image editing application determining the effects of the brush stroke on canvas pixels affected by the brush stroke dependent on the determined height, as described above. As previously noted, in some embodiments, the user may provide a continuous pressure input (e.g., using a stylus and tablet), whose value may change during the brush stroke. In the example illustrated in FIG. 10, if the pressure applied to the brush tool changes during the stroke, shown as the positive exit from 1060, the method may include repeating the operations illustrated in 1020-1050 to re-calculate the height of the brush tool above the canvas as a result of the change in pressure, and then to use this new height information to determine the effects of the brush stroke on the affected canvas pixels following the change in pressure. If there are no changes in the pressure during the stroke, or once there are no more changes in the pressure, shown as the negative exit from 1060, the method may include continuing to determine the effects of the brush stroke on the affected canvas pixels using the height of the brush tool that was most recently determined using equation (3) above.

Note that in the examples described herein, it may be assumed that the bristle stiffness value for a given brush tool is a static value, and that it is the same for all of the bristles of the brush tool. However, in some embodiments, the image editing application may support more complex brush models, such as models for brushes that include a mix of bristles of different types. Therefore, some of the bristles may have different stiffness values than other ones of the bristles in the brush. In various embodiments, the bristle brush simulations described herein may simulate the behavior of individual bristles of the brush and then may composite the results. Therefore, an image editing application may use different pressure-to-height mappings for different bristles of the brush. In such embodiments, the image editing application may determine which of the bristles of the brush (and what portion of those bristles) are in contact with the canvas during a brush stroke based on the height determined for the stiffest bristles. For example, if a brush has some very stiff bristles and some other bristles that are not very stiff, the very stiff bristles may prevent the user from pressing the brush into the canvas. In this case, even the less stiff bristles may not come in contact with the canvas.

As described herein, a single linear mapping of pressure to height may in some embodiments be suitable for describing the behavior of paintbrushes with bristles having low to mid-range stiffness values. One such mapping is illustrated in FIG. 11, according to one embodiment. In this example, the graph depicts a single, linear mapping 1100 between stylus pressure values (shown as 1110) and brush height values (shown as 1120). As described above, the brush height value labeled as $h_{min}$ 1140 may represent the height at which the brush model 1150 can be positioned above the canvas such that the bristles are touching the canvas, but the bristles have not started to bend in response to the applied pressure. In this example, the brush height value labeled as $h_0$ may represent the height of the brush as a result of the maximum possible change in height for the brush model (e.g., the height of the brush model when the brush tool has been pressed down into the canvas as far as it will go). In this example, the pressure value labeled $p_0$ 1115 may represent the pressure required to position the brush such that the height is $h_{min}$ (which may in some cases be zero), and the pressure value labeled $p_{max}$ 1130 may represent the pressure required to position the brush tool such that the height of brush model is $h_0$ 1125.

As described herein, for bristles of increasing stiffness, a single, linear mapping of pressure to height may not adequately represent the behavior of a paintbrush as pressure is applied. Therefore, in some embodiments, the mapping between pressure and height may be adjusted for bristle brush tools having different stiffness values, and bristle brush simulations employing such an adaptable mapping may better recreate the effect of painting with extremely stiff bristle brushes. For example, the image editing application may employ equations (2) and (3) above to adjust the mapping such that the effect of increased pressure on the resulting height of the brush is reduced as the stiffness of the bristles increases. This is illustrated by the graph in FIG. 12, according to one embodiment. In this example, the brush height value labeled as $h_{min}$ 1240 may represent the height at which the brush model 1250 can be positioned above the canvas such that the bristles are touching the canvas, but the bristles have not started to bend in response to the applied pressure; the brush height value labeled as $h_0$ may represent the height of the brush as a result of the maximum possible change in height for the brush model; the pressure value labeled $p_0$ 1215 may represent the pressure required to position the brush such that the height is $h_{min}$; and the pressure value labeled $p_{max}$ 1230 may represent the pressure required to position the brush tool such that the height of brush model is $h_0$ 1225. Note, however, that rather than depicting only a single, linear mapping between stylus pressure values 1210 and brush height values 1220, this graph illustrates several of a variety of mappings that may be employed, depending on the stiffness of the brush bristles.

In the graph illustrated in FIG. 12, mapping 1280 may in some embodiments represent a linear mapping similar to that illustrated in FIG. 11 and described above. In some embodiments, this mapping may be used when simulating the behavior of paintbrushes whose bristles have low to mid-range stiffness values (e.g., those having stiffness values at or below the mid-point of the available stiffness range, or 50% of the maximum supported stiffness value; or normalized stiffness values less than zero, where the normalized stiffness value may be calculated using equation (2) above to scale and shift the stiffness value).

As illustrated in FIG. 12, mappings other than the linear mapping depicted as mapping 1280 may be used when simulating the behavior of paintbrushes whose bristles have stiffness values higher than a mid-range value (e.g., stiffness values greater than 50% of the maximum supported stiffness value). For example, mapping 1270 may be used when the stiffness value is at 60% of the maximum supported stiffness value. For this stiffness value, mapping 1270 may again map a pressure value of $p_0$ (1215) to a height value of $h_{min}$ (1240).

However, at the maximum pressure value $p_{max}$ (1230), the height value determined by mapping 1270 in this example may be $h_1$ (1275). Similarly, mapping 1260 may be used when the stiffness value is at 80% of the maximum supported stiffness value. For this stiffness value, mapping 1260 may again map a pressure value of $p_0$ (1215) to a height value of $h_{min}$ (1240). However, at the maximum pressure value $p_{max}$ (1230), the height value determined by mapping 1260 in this example may be $h_2$ (1265). Note that in some embodiments, the mapping applied to a brush model with stiff bristles may be a non-linear mapping.

In yet another example, mapping 1250 may represent a mapping of pressure to height for bristles of maximum stiffness (e.g., bristles having a stiffness value that is 100% of the maximum stiffness value supported in the image editing application). In this example, the bristles may be so stiff that they are impossible to deform, no matter how much pressure is applied. Therefore, as illustrated in FIG. 12, whether the pressure value is $p_0$ (1215), the maximum pressure value $p_{max}$ (1230), or any value in between, the mapping may result in a height value of $h_{min}$ (1240). As described herein, different mappings may be employed for any or all other possible bristle stiffness values, e.g., according to equations (2) and (3) above.

As illustrated by the differences in the slopes of the various mappings depicted in FIG. 12, the methods described herein may be used to reduce the effects of increased pressure on brush model height for brush tools that represent stiffer paintbrushes. Thus, the system and methods described herein may provide a more realistic brush simulation experience for users who employ a variety of brush tools (including brush tools with different stiffness values) in an image editing application.

In some embodiments, performance of the methods described herein may be improved by integrating GPU acceleration for the brush simulation and/or rasterization operations described. This may result in a substantial increase in performance, especially when employing models of large brushes (e.g., those having a large footprint and/or a large number of bristles).

Figure 13:
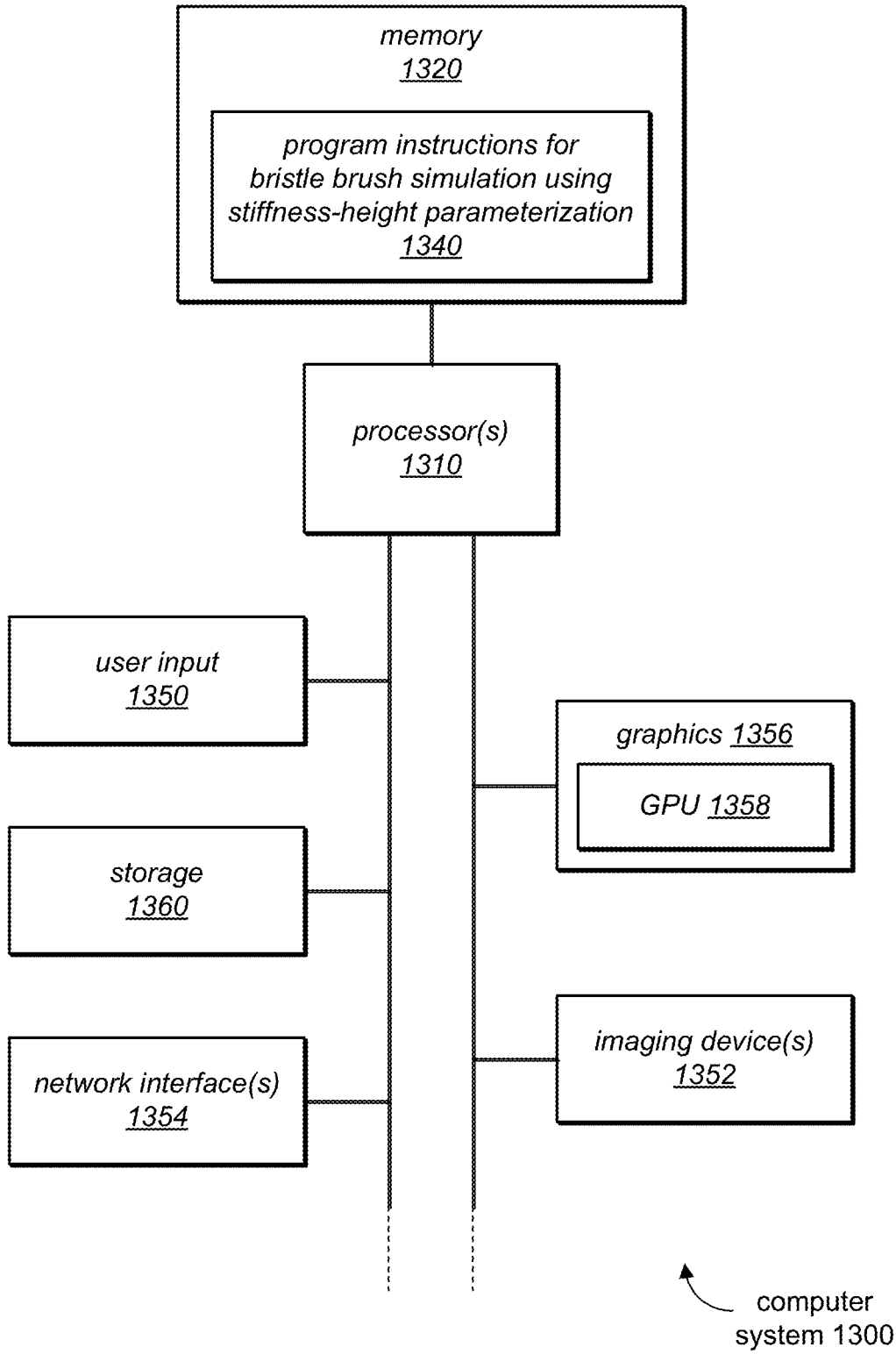
FIG. 13 is a block diagram illustrating constituent elements of a computer system that is configured to implement brush simulations in an image editing application that employs stiffness-height parameterization, according to various embodiments.

The methods described herein for simulating bristle brush behavior in an image editing application using stiffness-height parameterization may be performed by a computer system configured to provide the functionality described. FIG. 13 is a block diagram illustrating one embodiment of a computer system 1300 configured to implement such simulations (e.g., within an image editing application or any of a variety of graphics applications that provide such image editing functionality, such as painting, publishing, photography, games, animation, and other applications). Computer system 1300 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

The computer system 1300 may include one or more processors 1310 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1300, such as various versions of Unix, Linux, Windows® from Microsoft Corporation, MacOS® from Apple Inc., or any other operating system that enables the operation of software on a hardware platform. The processor(s) 1310 may be coupled to one or more of the other illustrated components, such as a memory 1320, by at least one communications bus.

In one embodiment, program instructions 1340 may be executable by the processor(s) 1310 to implement aspects of the techniques described herein (e.g., program instructions executable to cause computer system 1300 to perform bristle brush simulations using stiffness-height parameterization. For example, program instruction 1340 may include program instructions executable to implement a graphics application that may be configured to perform various image editing functions and to render new images accordingly. In some embodiments, a user may invoke operations to add, move or remove objects, resize objects or entire images, create, remove, or modify colors, texture-maps and/or textures of objects in an image, or otherwise alter an input image through a user interface of a graphics application, and this user interface may include one or more brush tools, each with a respective shape and/or number of bristles, as described herein. In some embodiments, program instructions 1340 may be configured to perform these operations and may employ the methods described herein for performing bristle brush simulations using stiffness-height parameterization. Program instructions 1340 may be configured to render output images (i.e. images modified by various image editing operations) to a separate window, or directly into the same frame buffer containing the input image, in different embodiments.

In various embodiments, program instructions 1340 may be partly or fully resident within the memory 1320 at the computer system 1300 at any point in time. For example, portions of the digital image editing program 100 and its constituent elements and data (e.g., editing operations 120, brush model 130, and/or brush behavior simulation functionality 140) and/or program instructions executable to perform bristle brush simulation using stiffness-height parameterization, as described herein, may be stored in the memory 1320. The memory 1320 may be implemented using any appropriate medium such as any of various types of ROM or RAM (e.g., DRAM, SDRAM, RDRAM, SRAM, etc.), or combinations thereof. The program instructions may also be stored on a storage device 1360 accessible from the processor(s) 1310. Any of a variety of storage devices 1360 may be used to store the program instructions 1340 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1360 may be coupled to the processor(s) 1310 through one or more storage or I/O interfaces. In some embodiments, the program instructions 1340 may be provided to the computer system 1300 via any suitable computer-readable storage medium including the memory 1320 and storage devices 1360 described above.

In one embodiment, a specialized graphics card or other graphics component 1356 may be coupled to the processor(s) 1310. The graphics component 1356 may include a graphics processing unit (GPU) 1358. A GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. In some embodiments, program instructions 1340 may utilize GPU 1358 when rendering or displaying images, and/or to accelerate other operations that are suitable for parallel processing, according to various embodiments. For example, GPU 1358 may implement a number of graphics primitive operations in a way that makes executing them much faster than drawing directly to the screen with CPU 1310. In other embodiments, the methods disclosed herein for simulating brush behavior using stiffness-height parameterization may be implemented by program instructions configured for parallel execution on one or more such GPUs. The GPU 1358 may implement one or more application programmer interfaces (APIs) that permit programmers to invoke the functionality of the GPU. Suitable GPUs may be commercially available from vendors such as NVIDIA Corporation, ATI Technologies, and others. In some embodiments, at least a portion of program instructions 1340 may be provided to GPU 1358 for performing image editing operations (or portions thereof) on GPU 1358 using one or more of the techniques described herein. In some embodiments, the techniques described herein may be implemented by a combination of program instructions 1340 executed on one or more processors 1310 and one or more GPUs 1358, respectively. Program instructions 1340 may also be stored on an external storage device (such as storage 1360) accessible by the processor(s) 1310 and/or GPU 1358, in some embodiments.

In some embodiments, computer system 1300 may include one or more imaging devices 1352. The one or more imaging devices 1352 may include various types of raster-based imaging devices such as monitors and printers. In one embodiment, one or more display devices 1352 may be coupled to the graphics component 1356 for display of data provided by the graphics component 1356. The computer system 1300 may also include one or more additional I/O interfaces, such as interfaces for one or more user input devices 1350. In addition, the computer system 1300 may include one or more network interfaces 1354 providing access to a network. It should be noted that one or more components of the computer system 1300 may be located remotely and accessed via the network. The program instructions 1340 may be implemented in various embodiments using any desired programming language, scripting language, or combination of programming languages and/or scripting languages, e.g., C, C++, C#, Java™, Perl, etc. The computer system 1300 may also include numerous elements not shown in FIG. 13, as illustrated by the ellipsis.

In various embodiments, the elements shown in various flow diagrams (e.g., FIGS. 6, 9, and 10) may be performed in a different order than the illustrated order. In these figures, any of the operations described in the elements may be performed programmatically (i.e., by a computer according to a computer program). In these figures, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
   using a computer to perform:
   receiving input representing a brush stroke made by a brush tool of an image editing application sweeping across a canvas;
   receiving input indicating a stiffness value for the brush tool;
   receiving input representing a pressure value applied during the brush stroke;
   determining a height value representing the height of the brush tool above the canvas during the brush stroke using a mapping between pressure values and height values, wherein the mapping is dependent on the stiffness value; and
   determining an effect of the brush stroke on the canvas dependent on the determined height value; and
   storing data representing an image on the canvas that was modified by the brush stroke.

2. The method of claim 1, wherein said receiving input indicating a stiffness value comprises:
   receiving input specifying the stiffness value through a graphical user interface of the image editing application.

3. The method of claim 1, wherein said receiving input indicating a stiffness value comprises:
   receiving input specifying that the brush tool is of a particular brush tool type; and
   accessing data comprising one or more parameter values associated with the particular brush tool type, where the one or more parameter values comprises the stiffness value.

4. The method of claim 1, wherein said receiving input representing a pressure value comprises:
   receiving input specifying the pressure value through a graphical user interface of the image editing application;
   wherein the pressure value is a static pressure value to be applied throughout the entire brush stroke.

5. The method of claim 1, wherein said receiving input representing a pressure value comprises:
   receiving continuous input representing two or more pressure values, each of which is applied during a portion of the brush stroke;
   wherein the continuous input is received through a graphical user interface of the image editing application.

6. The method of claim 1, wherein said determining the height value comprises:
   determining whether the stiffness value is less than a given stiffness threshold value;
   selecting one of a plurality of mappings between pressure values and height values dependent on results of said determining whether the stiffness value is less than the given stiffness threshold value; and
   applying the selected one of the plurality of mappings to the pressure value to determine the height value.

7. The method of claim 6,
   wherein in response to determining that the stiffness value is less than the given stiffness threshold value, said selecting one of a plurality of mappings comprises selecting a standard-stiffness mapping between pressure values and height values in which a maximum pressure value is mapped to a height value indicating that the brush tool is deformed by a maximum amount; and
   wherein the standard-stiffness mapping applies a linear function to pressure values to determine corresponding height values.

8. The method of claim 6,
   wherein in response to determining that the stiffness value is not less than the given stiffness threshold value, said selecting one of a plurality of mappings comprises selecting a high-stiffness mapping between pressure values and height values in which a maximum pressure value is mapped to a height value indicating that the brush tool is deformed by less than an amount by which the brush tool would be deformed if a standard-stiffness mapping were applied to the pressure value.

9. The method of claim 1, wherein the input representing a brush stroke and the input representing a pressure value applied during the brush stroke are received from a pressure-sensitive tablet to which a stylus is applied.

10. A computer-readable storage memory that is non-transitory, storing program instructions that when executed on one or more computers cause the one or more computers to perform:
- receiving input representing a brush stroke made by a brush tool of an image editing application sweeping across a canvas;
- receiving input indicating a stiffness value for the brush tool;
- receiving input representing a pressure value applied during the brush stroke;
- determining a height value representing the height of the brush tool above the canvas during the brush stroke using a mapping between pressure values and height values, wherein the mapping is dependent on the stiffness value; and
- determining an effect of the brush stroke on the canvas dependent on the determined height value; and
- storing data representing an image on the canvas that was modified by the brush stroke.

11. The computer-readable storage memory of claim 10, wherein said receiving input indicating a stiffness value comprises:
- receiving input specifying the stiffness value through a graphical user interface of the image editing application; or
- receiving input specifying that the brush tool is of a particular brush tool type and accessing data comprising one or more parameter values associated with the particular brush tool type, where the one or more parameter values comprises the stiffness value.

12. The computer-readable storage memory of claim 10, wherein said receiving input representing a pressure value comprises:
- receiving input specifying the pressure value through a graphical user interface of the image editing application;
- wherein the pressure value is a static pressure value to be applied throughout the entire brush stroke.

13. The computer-readable storage memory of claim 10, wherein said receiving input representing a pressure value comprises:
- receiving continuous input representing two or more pressure values, each of which is applied during a portion of the brush stroke;
- wherein the continuous input is received through a graphical user interface of the image editing application.

14. The computer-readable storage memory of claim 10, wherein said determining the height value comprises:
- determining whether the stiffness value is less than a given stiffness threshold value;
- in response to determining that the stiffness value is less than the given stiffness threshold value, selecting a standard-stiffness mapping from a plurality of mappings between pressure values and height values; and
- applying the standard-stiffness mapping to the pressure value to determine the height value;
- wherein the standard-stiffness mapping applies a linear function to pressure values to determine corresponding height values; and
- wherein the standard-stiffness mapping maps a maximum pressure value to a height value indicating that the brush tool is deformed by a maximum amount.

15. The computer-readable storage memory of claim 10, wherein said determining the height value comprises:
- determining whether the stiffness value is less than a given stiffness threshold value;
- in response to determining that the stiffness value is not less than the given stiffness threshold value, selecting a high-stiffness mapping from a plurality of mappings between pressure values and height values; and
- applying the high-stiffness mapping to the pressure value to determine the height value;
- wherein the high-stiffness mapping maps a maximum pressure value to a height value indicating that the brush tool is deformed by less than an amount by which the brush tool would be deformed if a standard-stiffness mapping were applied to the pressure value.

16. A system, comprising:
- one or more processors; and
- a memory coupled to the one or more processors, wherein the memory stores program instructions that when executed by the one or more processors cause the one or more processors to perform:
  - receiving input representing a brush stroke made by a brush tool of an image editing application sweeping across a canvas;
  - receiving input indicating a stiffness value for the brush tool;
  - receiving input representing a pressure value applied during the brush stroke;
  - determining a height value representing the height of the brush tool above the canvas during the brush stroke using a mapping between pressure values and height values, wherein the mapping is dependent on the stiffness value; and
  - determining an effect of the brush stroke on the canvas dependent on the determined height value; and
  - storing data representing an image on the canvas that was modified by the brush stroke.

17. The system of claim 16, wherein said receiving input indicating a stiffness value comprises:
- receiving input specifying the stiffness value through a graphical user interface of the image editing application; or
- receiving input specifying that the brush tool is of a particular brush tool type and accessing data comprising one or more parameter values associated with the particular brush tool type, where the one or more parameter values comprises the stiffness value.

18. The system of claim 16, wherein said receiving input representing a pressure value comprises:
- receiving input specifying the pressure value through a graphical user interface of the image editing application;
- wherein the pressure value is a static pressure value to be applied throughout the entire brush stroke.

19. The system of claim 16, wherein said receiving input representing a pressure value comprises:
- receiving continuous input representing two or more pressure values, each of which is applied during a portion of the brush stroke;
- wherein the continuous input is received through a graphical user interface of the image editing application.

20. The system of claim 16, wherein said determining the height value comprises:
- determining whether the stiffness value is less than a given stiffness threshold value;
- selecting one of a standard-stiffness mapping or a high-stiffness mapping from a plurality of mappings between pressure values and height values, where said selecting is dependent on whether the stiffness value is less than the given stiffness threshold value; and
- applying the selected one of the plurality of mappings to the pressure value to determine the height value.

* * * * *